United States Patent
Fujimoto et al.

(10) Patent No.: US 8,809,821 B2
(45) Date of Patent: Aug. 19, 2014

(54) HOLDER DEVICE, CHAMBER APPARATUS, AND EXTREME ULTRAVIOLET LIGHT GENERATION SYSTEM

(75) Inventors: Junichi Fujimoto, Hiratsuka (JP); Hidenobu Kameda, Oyama (JP); Osamu Wakabayashi, Hiratsuka (JP); Kouji Ashikawa, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 13/620,589

(22) Filed: Sep. 14, 2012

(65) Prior Publication Data

US 2013/0134330 A1    May 30, 2013

(30) Foreign Application Priority Data

Nov. 28, 2011    (JP) ................... 2011-259000

(51) Int. Cl.
  *G02B 7/02*    (2006.01)
(52) U.S. Cl.
  CPC ....................... *G02B 7/02* (2013.01)
  USPC ............... 250/504 R; 359/818; 359/819
(58) Field of Classification Search
  USPC ............... 250/504 R; 359/818, 819, 822
  See application file for complete search history.

(56) References Cited

U.S. PATENT DOCUMENTS

| | | | |
|---|---|---|---|
| 6,700,714 B2 * | 3/2004 | Zeller | 359/818 |
| 6,850,598 B1 | 2/2005 | Fryda et al. | |
| 6,956,706 B2 | 10/2005 | Brandon | |
| 8,000,212 B2 | 8/2011 | Senekerimyan et al. | |
| 8,173,984 B2 * | 5/2012 | Moriya et al. | 250/504 R |
| 2003/0123160 A1 | 7/2003 | Zeller | |
| 2007/0272661 A1 | 11/2007 | Whitehead et al. | |
| 2009/0086017 A1 | 4/2009 | Miyano | |
| 2009/0180503 A1 | 7/2009 | Funaoka et al. | |
| 2013/0020499 A1 * | 1/2013 | Kameda et al. | 250/435 |

FOREIGN PATENT DOCUMENTS

| | | |
|---|---|---|
| EP | 0 761 623 A2 | 3/1997 |
| JP | 62-156890 A | 7/1987 |
| JP | 2008-242184 A | 10/2008 |
| WO | WO-01/16051 A1 | 3/2001 |
| WO | WO-2012/026228 A1 | 3/2012 |

* cited by examiner

*Primary Examiner* — Kiet T Nguyen
(74) *Attorney, Agent, or Firm* — McDermott Will & Emery LLP

(57) ABSTRACT

A holder device for holding an optical element includes a holder having first and second members to sandwich the optical element therebetween, and a sealing member for creating a seal between the second member and the optical element.

24 Claims, 13 Drawing Sheets

HOLDER DEVICE, CHAMBER APPARATUS, AND EXTREME ULTRAVIOLET LIGHT GENERATION SYSTEM

CROSS-REFERENCE TO RELATED APPLICATION

The present application claims priority from Japanese Patent Application No. 2011-259000 filed Nov. 28, 2011.

BACKGROUND

1. Technical Field

This disclosure relates to a holder device, a chamber apparatus, and an extreme ultraviolet (EUV) light generation system.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed in which a system for generating EUV light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used.

SUMMARY

A holder device according to one aspect of this disclosure for holding an optical element may include a holder having first and second members to sandwich the optical element therebetween, and a first sealing member for creating a seal between the second member and the optical element.

A chamber apparatus according to another aspect of this disclosure may include a chamber, the aforementioned holder device, and a sealing member for sealing between the holder device and a wall of the chamber.

An extreme ultraviolet light generation system according to yet another aspect of this disclosure may include the aforementioned chamber apparatus, a laser apparatus configured to output a laser beam, a target supply unit configured to supply a target material into the chamber, and an optical system configured to focus the laser beam inside the chamber through the optical element.

BRIEF DESCRIPTION OF THE DRAWINGS

Hereinafter, exemplary embodiments of this disclosure will be described with reference to the accompanying drawings.

DETAILED DESCRIPTION

Figure 1:
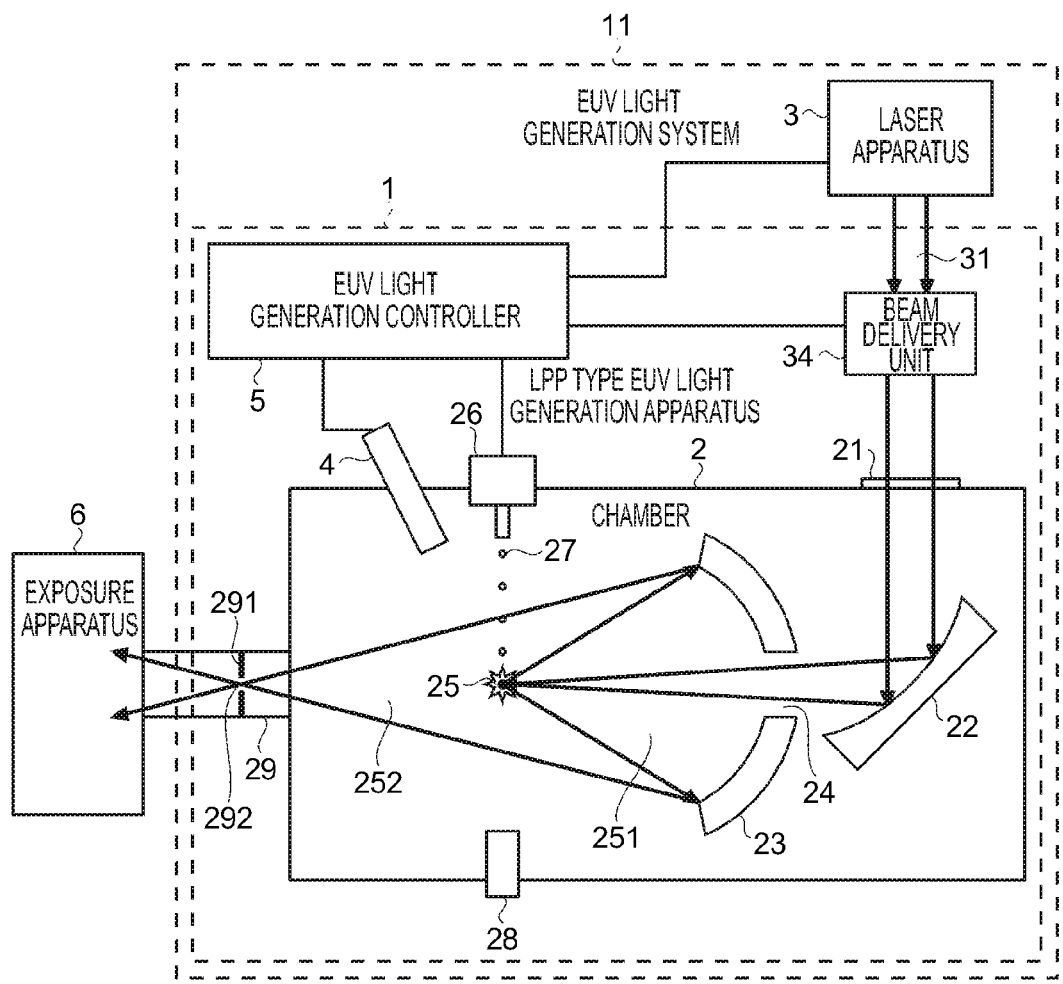
FIG. 1 schematically illustrates a configuration of an exemplary EUV light generation system.

Hereinafter, exemplary embodiments of this disclosure will be described in detail with reference to the accompanying drawings. The embodiments to be described below are merely illustrative in nature and do not limit the scope of this disclosure. Further, configurations and operations described in each embodiment are not all essential in implementing this disclosure. Note that like elements are referenced by like reference numerals and characters, and duplicate descriptions thereof will be omitted herein. The embodiments of this disclosure will be described following the table of contents below.

Contents

1. Overview
2. Overview of EUV Light Generation System
2.1 Configuration
2.2 Operation
3. EUV Chamber Including Transmissive Optical Element
3.1 Configuration
4. Basic Structure of Optical Element Holder
4.1 Configuration
4.2 Effect
5. Examples of Contact between Optical Element and Holder
5.1 Optical Element in Direct Contact with Holder
5.2 Metal Interposed between Optical Element and Holder 5.3 Optical Element Soldered to Holder
6. Variations of Structure of Optical Element Holder
7. Focusing Lens as Optical Element
8. Types of Contact
8.1 Surface Contact
8.2 Point Contact
8.3 Line Contact
8.4 Contact at Multiple Surfaces 1. Overview The embodiments to be described hereinafter pertain to a holder device configured to hold a transmissive optical element.

2. Overview of EUV Light Generation System 2.1 Configuration

FIG. 1 schematically illustrates a configuration of an exemplary Laser Produced Plasma (LPP) type EUV light generation system. An LPP type EUV light generation apparatus 1 may be used with at least one laser apparatus 3. Hereinafter, a system that includes the EUV light generation apparatus 1 and the laser apparatus 3 is referred to as an EUV light generation system 11. As illustrated in FIG. 1 and described in detail below, the EUV light generation system 11 may include a chamber 2 and a target supply unit. The target supply unit may be a droplet generator 26. The chamber 2 may be airtightly sealed. The droplet generator 26 may be mounted onto the chamber 2 to, for example, penetrate a wall of the chamber 2. A target material to be supplied by the droplet generator may include, but is not limited to, tin, terbium, gadolinium, lithium, xenon, or any combination thereof.

The chamber 2 may have at least one through-hole or opening formed in its wall, and a pulse laser beam 31 may travel through the through-hole/opening into the chamber 2. Alternatively, the chamber 2 may have a window 21, through which the pulse laser beam 31 may travel into the chamber 2. For example, an EUV collector mirror 23 having a spheroidal surface is provided inside the chamber 2. The EUV collector mirror 23 may have a multi-layered reflective film formed on the spheroidal surface thereof. The reflective film may include a molybdenum layer and a silicon layer, which are laminated alternately. The EUV collector mirror 23 may have a first focus and a second focus, and may be positioned such that the first focus lies in a plasma generation region 25 and the second focus lies in an intermediate focus (IF) region 292 defined by the specification of an external apparatus, such as an exposure apparatus 6. The EUV collector mirror 23 may have a through-hole 24 formed at the center thereof, and the pulse laser beam 31 may travel through the through-hole 24 toward the plasma generation region 25.

The EUV light generation system 11 may further include an EUV light generation controller 5 and a target sensor 4. The target sensor 4 may have an imaging function and detect at least one of the presence, the trajectory, and the position of a target 27.

Further, the EUV light generation system 11 may include a connection part 29 for allowing the interior of the chamber 2 to be in communication with the interior of the exposure apparatus 6. A wall 291 having an aperture may be provided inside the connection part 29, and the wall 291 may be positioned such that the second focus of the EUV collector mirror 23 lies in the aperture formed in the wall 291.

The EUV light generation system 11 may also include a beam delivery unit 34, a laser beam focusing mirror 22, and a target collector 28 for collecting targets 27. The beam delivery unit 34 may include an optical element (not separately shown) for defining the direction into which the pulse laser beam 31 travels and an actuator (not separately shown) for adjusting the position and the orientation (posture) of the optical element.

2.2 Operation

With continued reference to FIG. 1, the pulse laser beam 31 outputted from the laser apparatus 3 may pass through the beam delivery unit 34 and be outputted therefrom after having its direction optionally adjusted. The pulse laser beam 31 may travel through the window 21 and enter the chamber 2. The pulse laser beam 31 may travel inside the chamber 2 along at least one beam path from the laser apparatus 3, be reflected by a laser beam focusing mirror 22, and strike at least one target 27.

The target supply unit, e.g., the droplet generator 26, may be configured to output the target(s) 27 toward the plasma generation region 25 inside the chamber 2. The target 27 may be irradiated with at least one pulse of the pulse laser beam 31. Upon being irradiated with the pulse laser beam 31, the target 27 may be turned into plasma, and rays of light 251 including EUV light may be emitted from the plasma. At least the EUV light included in the light 251 may be reflected selectively by the EUV collector mirror 23. EUV light 252, which is the light reflected by the EUV collector mirror 23, may travel through the intermediate focus region 292 and be outputted to the exposure apparatus 6. Here, the target 27 may be irradiated with multiple pulses included in the pulse laser beam 31.

The EUV light generation controller 5 may be configured to control the EUV light generation system 11. The EUV light generation controller 5 may be configured to process image data of the target 27 captured by the target sensor 4. Further, the EUV light generation controller 5 may be configured to control at least one of the timing at which the target 27 is outputted and the direction into which the target 27 is outputted. Furthermore, the EUV light generation controller 5 may be configured to control at least one of the timing at which the laser apparatus 3 oscillates, the direction in which the pulse laser beam 31 travels, and the position at which the pulse laser beam 31 is focused. It will be appreciated that the various controls mentioned above are merely examples, and other controls may be added as necessary.

In the above-described EUV light generation system 11, the pulse laser beam 31 to enter the chamber 2 may be a high-power laser beam of, for example, 10 kW or higher. When the pulse laser beam 31 is a high-power laser beam, optical performance of an optical element, such as the window 21, through which the pulse laser beam 31 passes, may be reduced due to a thermal stress. Further, possible thermal expansion of the optical element may break the airtight seal between the chamber 2 and the optical element, such as window 21. Accordingly, this disclosure proposes, but is not limited to, the following embodiments.

3. EUV Chamber Including Transmissive Optical Element 3.1 Configuration

Figure 2:
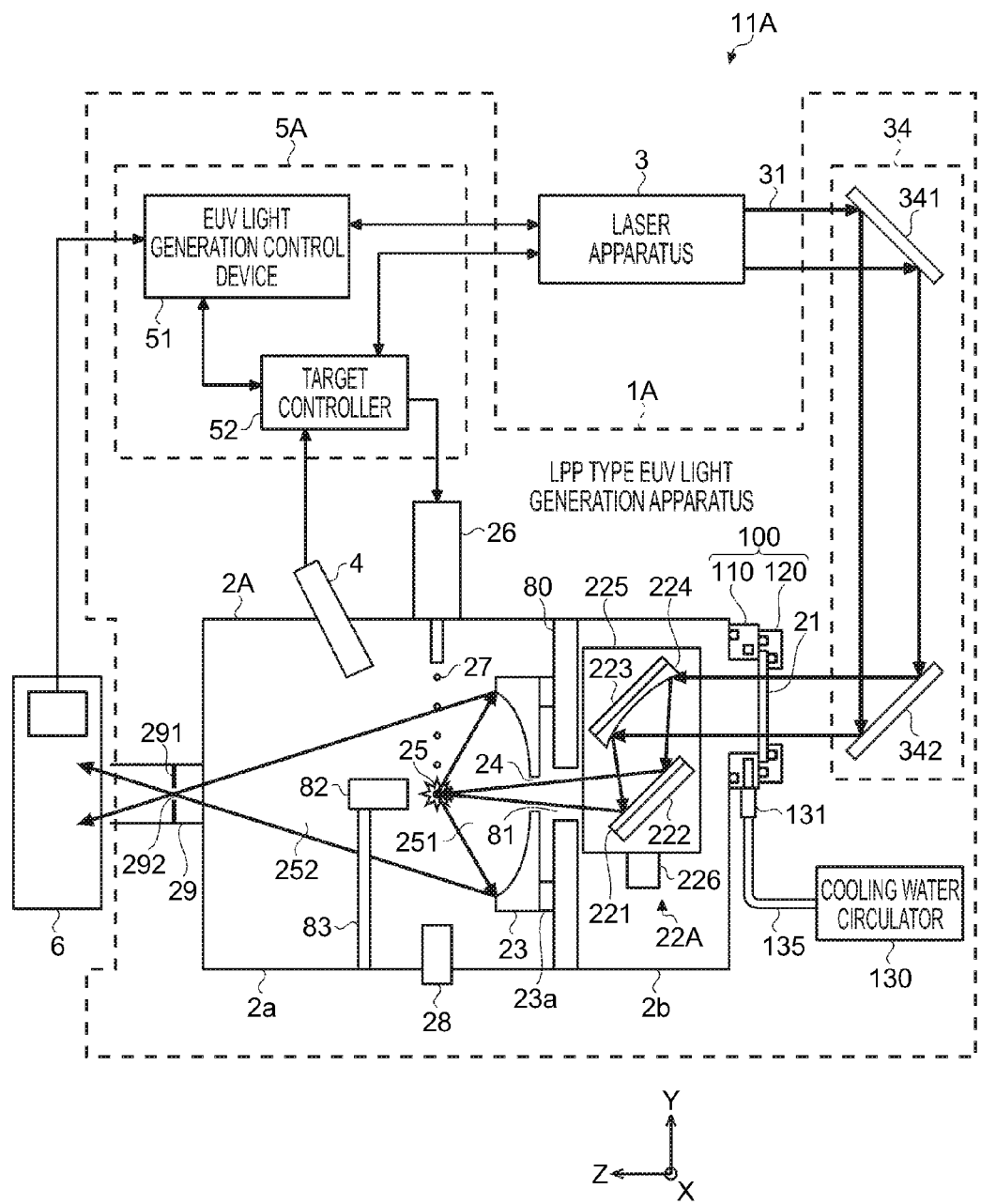
FIG. 2 schematically illustrates an exemplary configuration of an EUV light generation system according to a first embodiment of this disclosure.

FIG. 2 schematically illustrates an exemplary configuration of an EUV light generation system according to a first embodiment of this disclosure. As shown in FIG. 2, an EUV light generation system 11A may include an EUV light generation apparatus 1A and the laser apparatus 3. The EUV light generation apparatus 1A may include the beam delivery unit 34, a chamber 2A, the connection part 29, a cooling water circulator 130, and an EUV light generation controller 5A. The EUV light generation controller 5A may include an EUV light generation control device 51 and a target controller 52.

The beam delivery unit 34 may include a plurality of optical elements, such as high-reflection mirrors 341 and 342.

The pulse laser beam 31 outputted from the laser apparatus 3 may be guided to the chamber 2A by the beam delivery unit 34.

The chamber 2A may be divided into two spaces 2a and 2b by a partition 80. The space 2b may be located upstream from the space 2a in a beam path of the pulse laser beam 31. A through-hole 81 may be formed in the partition 80.

As shown in FIG. 2, a holder 100 may be provided, and the holder 100 may include a first member 110 and a second member 120. The holder 100 may be mounted to the outer wall of the chamber 2A. The cooling water circulator 130 may be connected to the holder 100 through a pipe 135. The interior of the chamber 2A may be kept at a pressure that is lower than a pressure outside the chamber 2A. The window 21 may be held by the holder 100 and placed between the first member 110 and the second member 120. The holder 100 may be fixed to the outer wall of the chamber 2A such that the window 21 covers an opening 201 (see FIG. 3) formed in the chamber 2A. The chamber 2A and the first member 110 may be airtightly connected to each other. In addition, the first member 110 and the second member 120 may be airtightly connected to each other with the window 21 provided therebetween. Details of the holder 100 will be given later.

A laser beam focusing optical system 22A may be provided in the space 2a. The laser beam focusing optical system 22A may include a laser beam focusing mirror 224 and a high-reflection mirror 221. The laser beam focusing optical system 22A may further include a moving plate 225, a plate moving mechanism 226, and mirror holders 222 and 223. The mirror holder 222 may be provided with an automatic tilt mechanism (not separately shown). The laser beam focusing mirror 224 may be an off-axis paraboloidal mirror. The laser beam focusing mirror 224 may be fixed to the moving plate 225 through the mirror holder 223. The high-reflection mirror 221 may be fixed to the moving plate 225 through the mirror holder 222. The plate moving mechanism 226 may be configured to move the laser beam focusing mirror 224 and the high-reflection mirror 221 along with the moving plate 225.

The EUV collector mirror 23, the droplet generator 26, the target collector 28, the target sensor 4, and a beam dump 82 may be provided in the space 2a. The EUV collector mirror 23 may be fixed to the partition 80 through a mirror holder 23a. The through-hole 24 in the EUV collector mirror 23 may be aligned with the through-hole 81 in the partition 80. The beam dump 82 may be provided in a beam path of the pulse laser beam 31 downstream from the plasma generation region 25 to absorb the pulse laser beam 31. The beam dump 82 may be fixed to the inner wall of the chamber 2A through a support member 83.

4. Basic Structure of Optical Element Holder 4.1 Configuration

Figure 3:
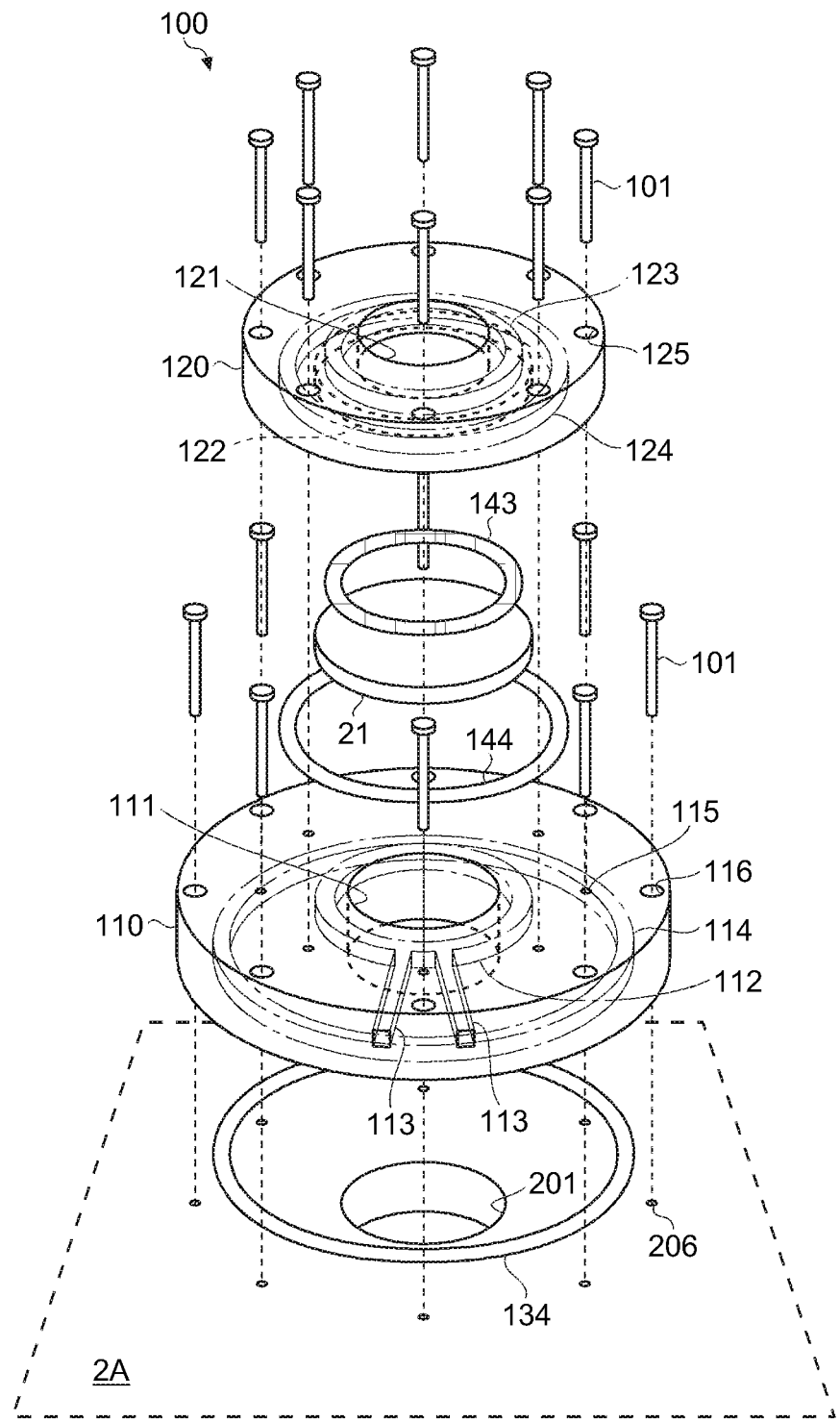
FIG. 3 is an exploded view of a holder shown in FIG. 2.
Figure 4:
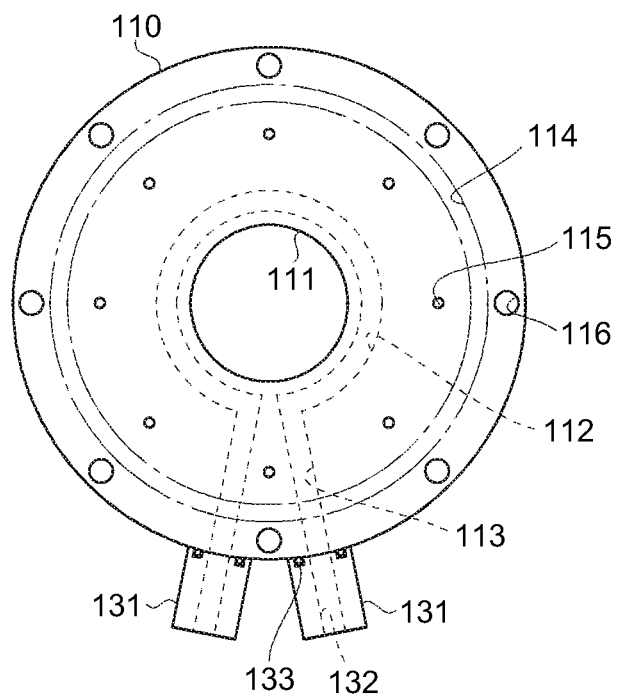
FIG. 4 shows an exemplary configuration of a first member shown in FIG. 3, as viewed toward a surface thereof at which the first member comes into contact with a second member.
Figure 5:
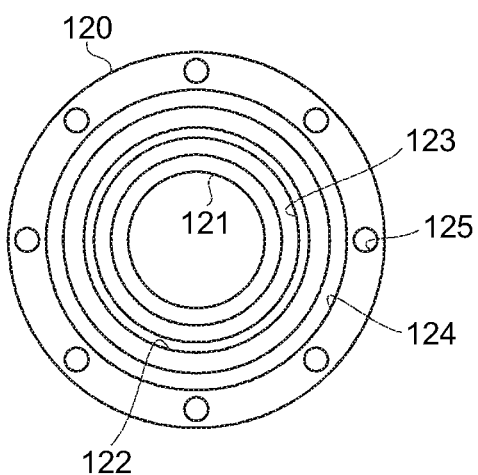
FIG. 5 shows an exemplary configuration of a second member shown in FIG. 3, as viewed toward a surface thereof at which the second member comes into contact with a first member.

FIG. 3 is an exploded view of the holder 100 shown in FIG. 2. FIG. 4 shows an exemplary configuration of the first member 110 shown in FIG. 3, as viewed toward a surface at which the first member comes into contact with the second member 120. FIG. 5 shows an exemplary configuration of the second member 120 shown in FIG. 3, as viewed toward a surface at which the second member comes into contact with the first member.

As shown in FIG. 3, the holder 100 may include the first member 110, the second member 120, gaskets 134, 143, and 144, and bolts 101. When the window 21 is formed of diamond, each of the first member 110 and the second member 120 may be formed of aluminum, copper, stainless steel, silicon carbide (SiC), aluminum nitride (AlN), or the like. However, this disclosure is not limited to these materials, and various other suitable materials may be used. Here, a material that has a sufficient strength, excels in thermal resistance, and has high heat conductivity may be used.

As shown in FIGS. 3 and 4, the first member 110 may be disc-shaped and have first and second flat surfaces. The first and second surfaces may be parallel to each other or may be inclined with respect to each other. A circular through-hole 111 may be formed at substantially the center of the first member 110, and thus, the first and second surfaces of the first member 110 may be substantially annular in shape.

A flow channel 112 may be formed inside the first member 110. The flow channel 112 may be substantially annular in shape to follow along the inner circumferential surface of the first member 110. The cross-sectional shape of the flow channel 112 may be circular, elliptical, or polygonal. The flow channel 112 may be discontinuous, and an end at the discontinuous portion may be connected to a flow channel 113. The flow channel 113 may open into the outer circumferential surface of the first member 110. The flow channel 113 may then be connected to the pipe 135 through a joint 131 (see FIG. 2). When multiple flow channels 113 are provided as shown in FIGS. 3 and 4, one of the flow channels 113 may serve as a flow-in channel through which cooling water from the cooling water circulator 130 flows into the flow channel 112, and another flow channel 113 may serve as a flow-out channel through which the cooling water that has circulated in the follow channel 112 flows into the pipe 135.

The joint 131 may include a through-hole 132 and a gasket 133. The joint 131 may be attached to the first member 110 using bolts (not separately shown). Alternatively, the joint 131 may include threads (not separately shown), and the threads may be inserted into respective threaded holes (not separately shown) formed in the first member 110, to thereby be fixed to the first member 110. The gasket 133 may airtightly seal between the joint 131 and the first member 110 when the joint 131 is attached to the first member 110. The through-hole 132 may be in communication with the flow channel 113 when the joint 131 is attached to the first member 110.

Further, threaded holes 115 may be formed in the first surface of the first member 110, and bolts 101 may be inserted into the respective threaded holes 115 to fix the second member 120 to the first member 110. The threaded holes 115 may not penetrate the first member 110. Further, the first member 110 may have through-holes 116 formed therein, into which bolts 101 are inserted to fix the first member 100 to the chamber 2A. The bolts 101 may be inserted into the respective through-holes 116 with respective washers (not separately shown) provided therebetween. The bolts 101 inserted into the respective through-holes 116 may then be inserted into respective threaded holes 206 formed in the outer wall of the chamber 2A. The through-hole 111 in the first member 110 may be aligned with the opening 201 in the chamber 2A.

A groove 114 may be formed in the second surface of the first member 110, and the gasket 134 may be fitted into the groove 114. The groove 114 may be deep enough for at least part of the gasket 134 to protrude from the groove 114. The gasket 134 may be elastically deformable to come into close contact with the outer surface of the chamber 2A and with the bottom of the groove 114 when the first member 110 is fixed to the outer wall of the chamber 2A with the bolts 101. Hence, the first member 110 and the chamber 2A may be airtightly connected to each other. For example, gasket 134 is an O-ring. The gasket 134 may be formed of fluorine rubber or metal, such as copper. However, this disclosure is not limited to these materials, and various other suitable materials may be used to form the gasket 134.

As shown in FIGS. 3 and 5, the second member 120 may be disc-shaped and have first and second flat surfaces. The first and second flat surfaces may be parallel to each other. A circular through-hole 121 may be provided at substantially the center of the second member 120, and each of the first and second surfaces of the second member 120 may be substantially annular in shape.

A groove 122 may be formed in the second surface of the second member 120, and the window 21 may be fitted into the groove 122. The groove 122 may be formed to be concentric with the through-hole 121. The depth of the groove 122 may be substantially the same as the thickness of the window 21. A groove 123 may be formed in the bottom surface of the groove 122. The gasket 143 may be fitted into the groove 123. The groove 123 may be deep enough for at least part of the gasket 143 to protrude from the groove 123.

Further, through-holes 125 may be formed in the second member 120, and the bolts 101 may be inserted into the respective through-holes 125 to fix the second member 120 to the first member 110. The bolts 101 may be inserted into the respective through-holes 125 with respective washers (not separately shown) provided therebetween. The bolts 101 inserted into the respective through-holes 125 may then be inserted into the respective threaded holes 115 formed in the first surface of the first member 110. Here, the through-hole 121 in the second member 120 may be aligned with the through-hole 111 in the first member 110.

A groove 124 may be formed in the second surface of the second member 120, and the gasket 144 may be fitted into the groove 124. The groove 124 may be deep enough for at least part of the gasket 144 to protrude from the groove 124. The gasket 144 may be elastically deformable to come into close contact with the first surface of the first member 110 and with the bottom of the groove 124 when the second member 120 is fixed to the first surface of the first member 110 with the bolts 101. Hence, the first member 110 and the second member 120 may be airtightly connected to each other. Here, the gasket 143 fitted in the groove 123 may also be elastically deformable to come into close contact with a surface of the window 21 and with the bottom of the groove 123. Hence, the window 21 and the second member 120 may be airtightly connected to each other. Each of the gaskets 143 and 144 may be an O-ring. Each of the gaskets 143 and 144 may be formed of fluorine rubber or metal, such as copper. However, this disclosure is not limited to these materials, and various other suitable materials may be used to form the gaskets 143 and 144.

The window 21 may be provided to be in contact with the first surface of the first member 110 when the second member 120 is fixed to the first surface of the first member 110 with the bolts 101. A shape of mating surfaces between the window 21 and the first surface of the first member 110 may be symmetrical about the axis of the through-hole 111 and/or the window 21. Here, the window 21 and the first member 110 may or may not be connected airtightly to each other.

When the EUV light generation system 11A is in operation, the interior of the chamber 2A may be kept at a pressure that is lower than that of the exterior of the chamber 2A. Under the aforementioned state, the holder 100 may be attached to the chamber 2A such that a first surface of the window 21 faces the exterior of the chamber 2A and a second surface of the window 21 faces the interior of the chamber 2A. The gasket 143 to airtightly connect the window 21 to the second member 120 may be provided toward the first surface of the window 21. The second surface of the window 21 may be in contact with a member, such as the first member 110 in this example, having relatively high thermal conductivity, which will be later described with specific examples. The cooling water may cool the first member 110 which is in contact with the second surface of the window 21. Here, an area between at which the first member 110 and the second surface of the window 21 are in contact with each other may preferably be large.

4.2 Effect

As described above, since the first member 110 and the window 21 are in contact through a structure leading to relatively high thermal conductivity, the window 21 heated by absorbing apart of the pulse laser beam 31 passing therethrough may be cooled effectively. Accordingly, reduction in optical performance of the window 21 may be suppressed.

Further, while the EUV light generation system 11A is in operation, a pressure difference between the interior and the exterior of the chamber 2A may help the window 21 stay in close contact with the first member 110. Accordingly, the window 21 may be cooled efficiently. At that point, since the elastic gasket 143 may create an airtight seal between the first surface of the window 21 and the second member 120, the chamber 2A may be kept airtight.

5. Examples of Contact between Optical Element and Holder 5.1 Optical Element in Direct Contact with Holder A case where the second surface of the window 21 is in direct contact with the holder 100 will be described with reference to FIG. 6.

Figure 6:
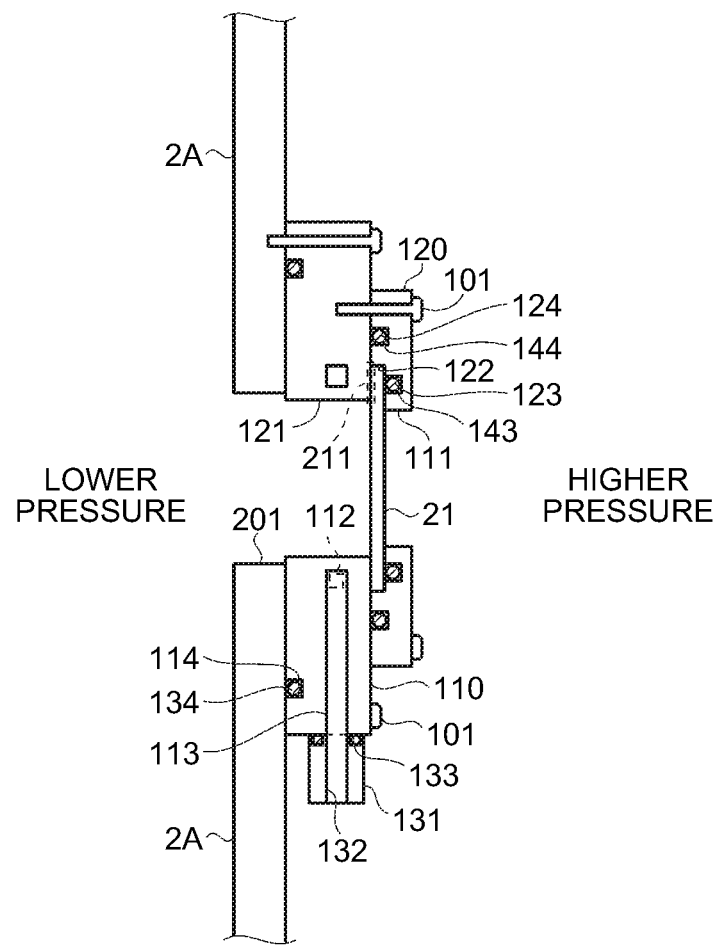
FIG. 6 is a sectional view schematically illustrating an exemplary configuration of the holder shown in FIG. 2, in which a surface of the window is in direct contact with the holder.

As shown in FIG. 6, there is a direct contact portion 211 where the second surface of the window 21 may be in direct contact with the first surface of the first member 110. The direct contact portion 211 may or may not airtightly seal between the first member 110 and the window 21. When the first member 110 and the window 21 are in direct contact, heat in the window 21 may efficiently be conducted to the first member 110. Accordingly, the window 21 may be cooled efficiently.

Here, airtightness between the window 21 and the holder 100 may be retained by the gaskets 134, 143, and 144. That is, the gasket 143 may create an airtight seal between the second member 120 and the window 21, the gasket 144 may create an airtight seal between the second member 120 and the first member 110, and the gasket 134 may create an airtight seal between the first member 110 and the chamber 2A. As a result, even when the window 21 is biased against the first member 110 due to, for example, a pressure difference, the deformable gasket 143 may retain the airtight seal between the window 21 and the second member 120. As a result, the chamber 2A may be kept airtight.

5.2 Metal Interposed between Optical Element and Holder

A case where a material having high thermal conductivity is provided between the second surface of the window 21 and the holder 100 will now be described with reference to FIG. 7.

Figure 7:
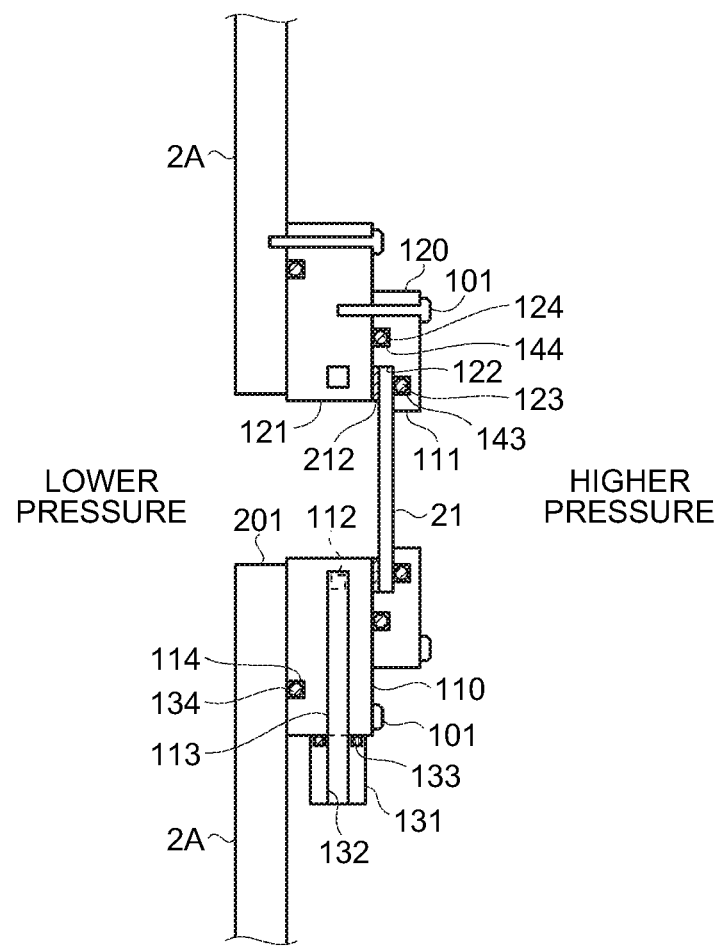
FIG. 7 a sectional view schematically illustrating an exemplary configuration of the holder shown in FIG. 2, in which a material having high thermal conductivity is interposed between a surface of the window and the holder.

As shown in FIG. 7, a contact member 212 may be provided between the second surface of the window 21 and the first surface of the first member 110. The contact member 212 may be in direct contact with the second surface of the window 21 and with the first surface of the first member 110. The contact member 212 and the window 21, and the contact member 212 and the first member 110, respectively, may or may not be connected airtightly to each other.

The contact member 212 may be formed of a material having relatively high thermal conductivity, such as metal. Accordingly, heat in the window 21 may be efficiently conducted to the first member 110. As a result, the window 21 may be cooled efficiently.

Further, the contact member 212 may be formed of a relatively soft material, such as gold (Au), indium (In), and tin (Sn). Then, an area at which the contact member 212 and the window 21 are in contact with each other and an area at which the contact member 212 and the first member 110 are in contact with each other may be increased. As a result, thermal conduction efficiency from the window 21 to the first member 110 may be increased, and the window 21 may be cooled efficiently. Further, airtightness between the contact member 212 and the window 21 and airtightness between the contact member 212 and the first member 110 may be enhanced.

5.3 Optical Element Soldered to Holder

A case where the second surface of the window 21 is soldered to the holder 100 will now be described with reference to FIG. 8.

Figure 8:
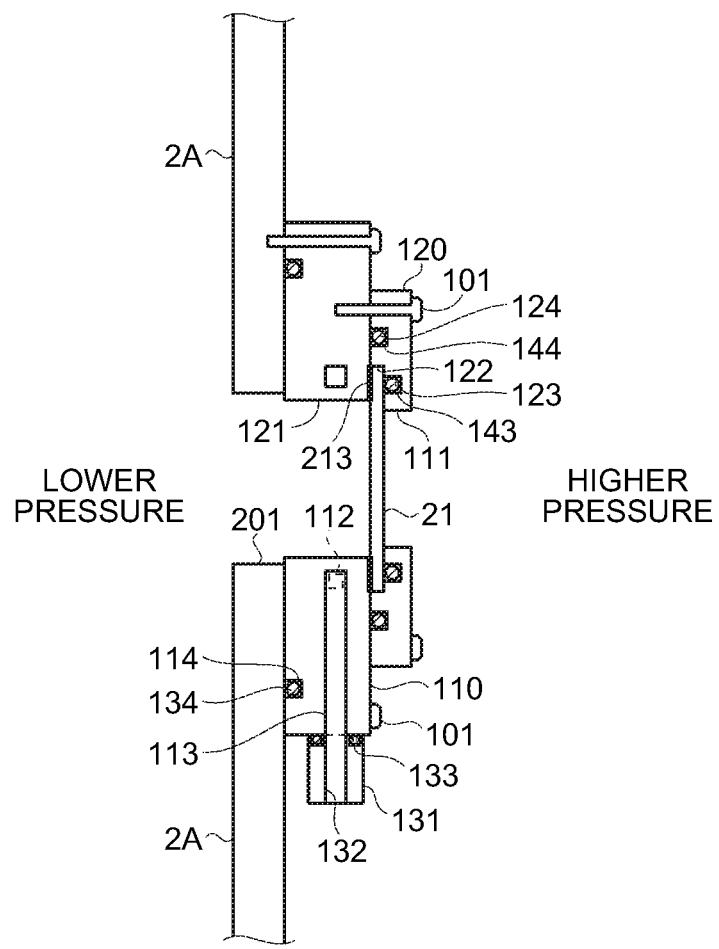
FIG. 8 is a sectional view schematically illustrating an exemplary configuration of the holder shown in FIG. 2, in which a surface of the window is soldered to the holder.

As shown in FIG. 8, a soldered portion 213 may be formed between the second surface of the window 21 and the first surface of the first member 110. A material used for soldering may, for example, include solder or silver solder. Then, an area at which the window 21 is in contact with the holder 100 may be increased compared to a case where the second surface of the window 21 and the holder 100 are in direct contact. As a result, thermal conduction efficiency from the window 21 to the first member 110 may be increased, and the window 21 may be cooled efficiently. Further, airtightness between the window 21 and the first member 110 may be enhanced.

6. Variations of Structure of Optical Element Holder

Figure 9:
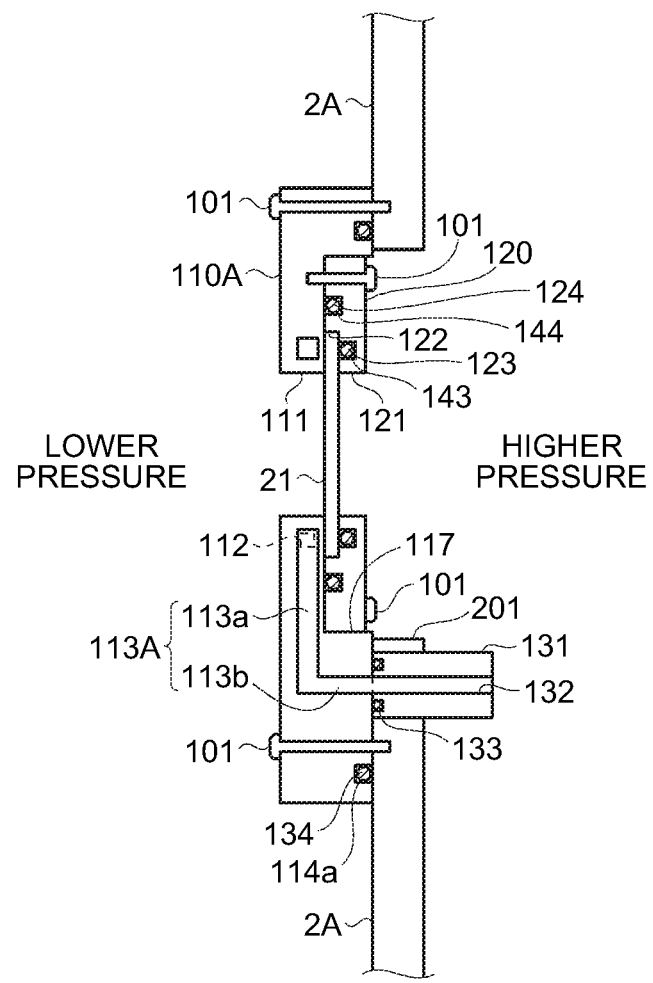
FIG. 9 is a sectional view schematically illustrating an exemplary configuration of a holder according to a second embodiment of this disclosure.
Figure 10:
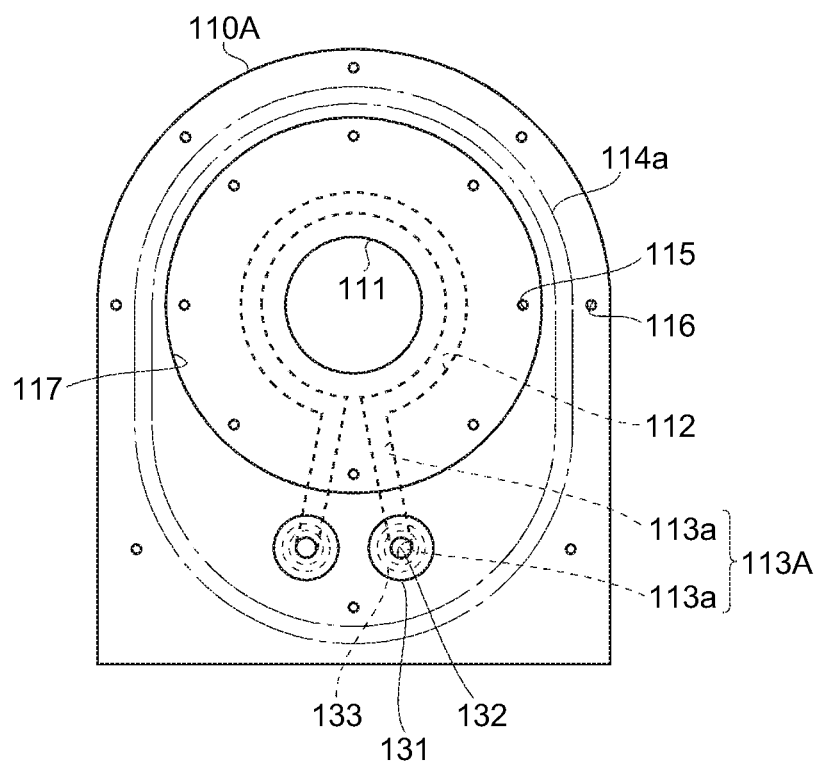
FIG. 10 shows an exemplary configuration of a first member shown in FIG. 9, as viewed toward a surface at which the first member comes into contact with a second member.

In the above-described embodiment, the holder 100 may be attached on the outer wall of the chamber 2A. However, this disclosure is not limited to this configuration, and the holder 100 may be attached on the inner surface of the chamber 2A. FIG. 9 is a sectional view schematically illustrating a configuration of a holder attached on an inner wall of a chamber according to a second embodiment of this disclosure. FIG. 10 shows an exemplary configuration of a first member shown in FIG. 9, as viewed toward a surface at which the first member comes into contact with a second member. In the second embodiment, the second member 120 may, for example, be configured similarly to the second member 120 shown in FIG. 5.

As shown in FIGS. 9 and 10, a first member 110A may be fixed at a first surface thereof to the inner wall of the chamber 2A using the bolts 101. A space between the inner wall of the chamber 2A and the first member 110A may be airtightly sealed by the gasket 134 fitted into a groove 114a.

The first member 110A may have a groove 117 formed in the first surface thereof to accommodate the second member 120. The diameter of the groove 117 may be either smaller or larger than the diameter of the opening 201 in the chamber 2A. When the diameter of the groove 117 is larger than the diameter of the opening 201, the depth of the groove 117 may be greater than the thickness of the second member 120. The second member 120 may be fixed on the bottom of the groove 117 using the bolts 101, as in the holder 100 described above.

A flow channel 113A to connect the flow channel 112 in the first member 110A to the joint 131 may include a first channel 113a extending from an end of the flow channel 112 and a second channel 113b extending from the first channel 113a and having an opening in the surface of the first member 110A. The joint 131 may be attached to the first member 110A at the opening of the second channel 113b so that the second channel 113b is in communication with the throughhole 132. A through-hole may be formed in the chamber 2A, and the joint 131 may be fitted into that through-hole.

The groove 114a, into which the gasket 134 is to be fitted, may be provided to surround the groove 117 and the connection part between the joint 131 and the second channel 113b. This configuration may create an airtight seal between the first member 110A and the chamber 2A. Further, even if cooling water leaks from the connection part between the second channel 113b and the joint 131, the cooling water may be prevented from flowing into the chamber 2A by the gasket 134. Here, the groove 117 may be provided in the first surface of the first member 110A or in the inner wall of the chamber 2A.

7. Focusing Lens as Optical Element

The above-described embodiments may be applied when the window 21 is formed of a parallel plate or a wedge substrate. However, this disclosure is not limited thereto. For example, a focusing lens having at least one convex surface may be used in place of the window 21.

Figure 11:
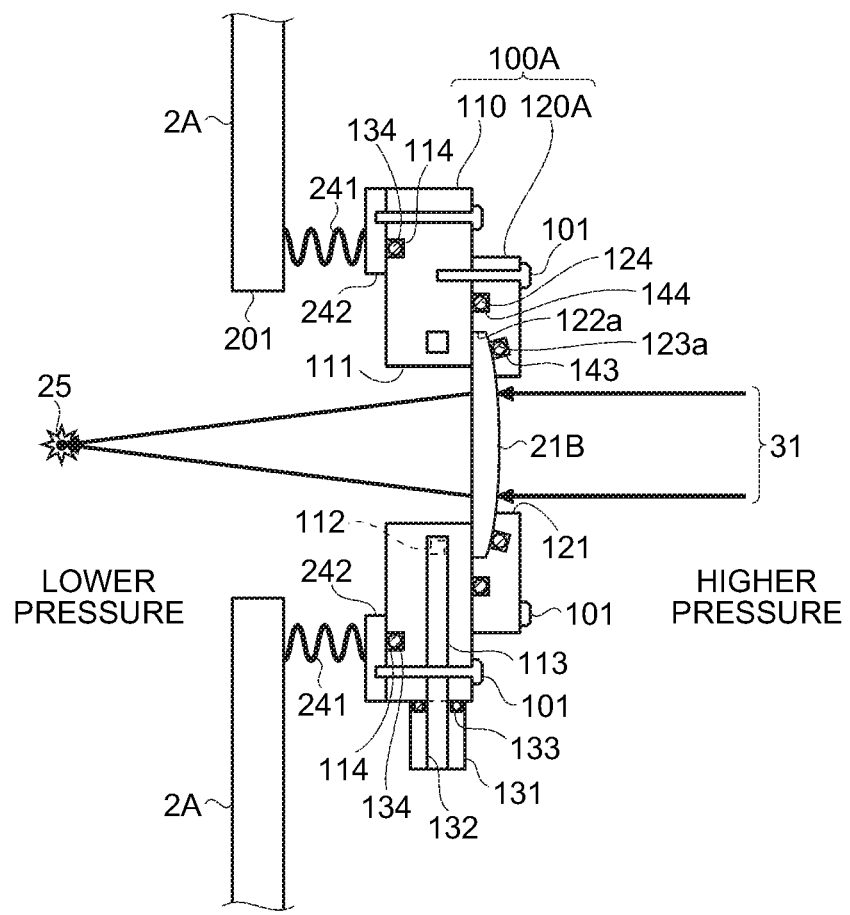
FIG. 11 is a sectional view schematically illustrating an exemplary configuration of a holder according to a third embodiment.

FIG. 11 is a sectional view schematically illustrating an exemplary configuration of a holder where a focusing lens is used as an optical element according to a third embodiment. As shown in FIG. 11, a holder 100A may include a second member 120A in place of the second member 120. The holder 100A may be configured to hold a focusing lens 21B. The first member 110 may be similar to the first member 110 of the holder 100. The holder 100A may be fixed to a deformable flange 241 provided on the chamber 2A.

Figure 12:
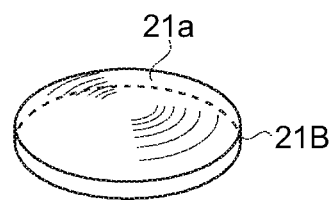
FIG. 12 is a perspective view of a focusing lens shown in FIG. 11.

FIG. 12 is a perspective view schematically illustrating an exemplary configuration of the focusing lens shown in FIG. 11. As shown in FIG. 12, the focusing lens 21B may have at least one convex surface 21a. The focusing lens 21B may, for example, be formed of diamond.

Figure 13:
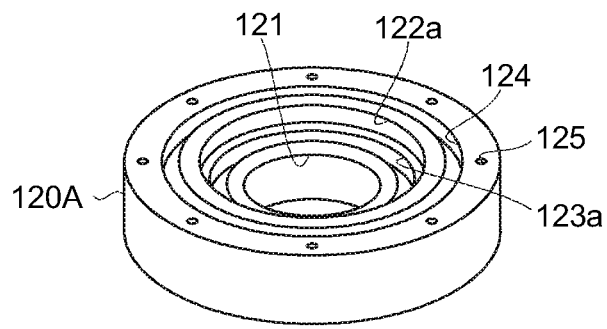
FIG. 13 schematically illustrates an exemplary configuration of a second member shown in FIG. 11.

FIG. 13 is a perspective view schematically illustrating an exemplary configuration of the second member shown in FIG. 11. As shown in FIGS. 11 and 13, the bottom of the groove 122 formed in the second member 120A may be curved to follow the curved surface of the convex surface 21a of the focusing lens 21B. The gasket 134 may be fitted into the groove 124 formed in the bottom of the groove 122a to create an airtight seal between the second member 120A and the focusing lens 21B.

Further, as shown in FIG. 11, the focusing lens 21B and the first member 110 may be in contact with each other in any of the contact modes described with reference to FIGS. 6 through 8. The first member 110 may be fixed on a ringshaped substrate 242 provided at a first end of the deformable flange 24 through a method similar to that between the first member 110 and the chamber 2A.

The deformable flange 241 may be a bellows. A second of the deformable flange 241 may be fixed to the chamber 2A to surround the opening 201 formed in the chamber 2A. The deformable flange 241 may be deformed by a driving mechanism (not separately shown) to displace the ring-shaped substrate 242 three-dimensionally.

With the above-described configuration, even when the focusing lens 21B is used in place of the window 21, a similar effect to that of the above-described embodiments may be obtained.

8. Types of Contact

Types of contact between the window 21 or the focusing lens 21B and the first member 110 or 110A or the contact member 212 will now be described with examples. In the description to follow, a case where the window 21 and the first member 110 are in direct contact with each other will be illustrated, but this disclosure is not limited thereto, and other combinations may be configured similarly.

8.1 Surface Contact

Figure 14:
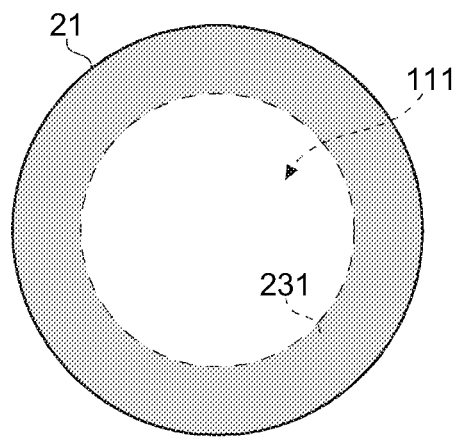
FIG. 14 shows a case where a window and a first member are in a surface contact with each other.

A case where the window 21 and the first member 110 are in surface contact will be described first with reference to FIG. 14. As shown in FIG. 14, the window 21 and the first member 110 may form a surface contact 231. In that case, at least a portion of the second surface of the window 21 which comes into contact with the first member 110 may have relatively high flatness. The flatness of this portion may, for example, be enhanced by grinding. Similarly, at least a portion of the first surface of the first member 110 which comes into contact with the window 21 may have relatively high flatness, and the flatness of this portion may, for example, be enhanced by grinding.

By forming the surface contact 231 at mating surfaces of the window 21 and the first member 110, an area at which the window 21 and the first surface 110 are in contact with each other may be increased. Accordingly, the window 21 may be cooled efficiently.

A shape of the surface contact 231 between the window 21 and the first member 110 may be symmetric about the axis of the window 21 and/or the through-hole 111. Since the contact surface 231 is symmetric, the window 21 may be cooled uniformly from the periphery thereof. As a result, optical performance of the window 21 may be stabilized. Here, the window 21 may be positioned such that the beam axis of the pulse laser beam 31 passing through the window 21 substantially coincides with the axis of the window 21. Then, the window 21 may be cooled more uniformly, and optical performance thereof may further be stabilized.

8.2 Point Contact

Figure 15:
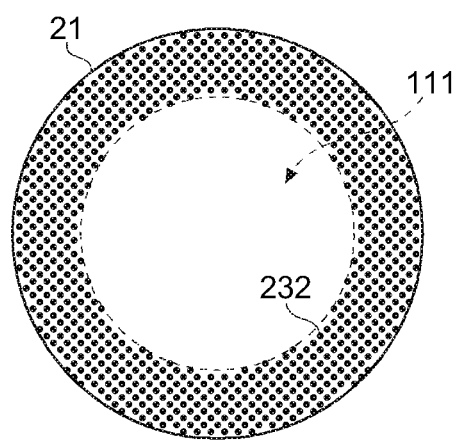
FIG. 15 shows a case where a window and a first member are in a point contact.

A case where the window 21 and the first member 110 are in point contact at multiple points will now be described with reference to FIG. 15. As shown in FIG. 15, the window 21 and the first member 110 may form a point contact 232 at multiple points. In that case, multiple protrusions may be formed on a portion of a surface of at least one of the window 21 and the first member 110. The protrusions may, for example, be formed through sandblast.

The protrusions may be distributed symmetrically about the axis of the window 21 and/or the through-hole 111. Since the protrusions are distributed symmetrically, the window 21 may be cooled uniformly from the periphery thereof. As a result, optical performance of the window 21 may be stabilized. Here, the window 21 may be positioned such that the beam axis of the pulse laser beam 31 passing through the window 21 substantially coincides with the axis of the window 21. Then, the window 21 may be cooled more uniformly, and optical performance thereof may further be stabilized.

8.3 Line Contact

Figure 16:
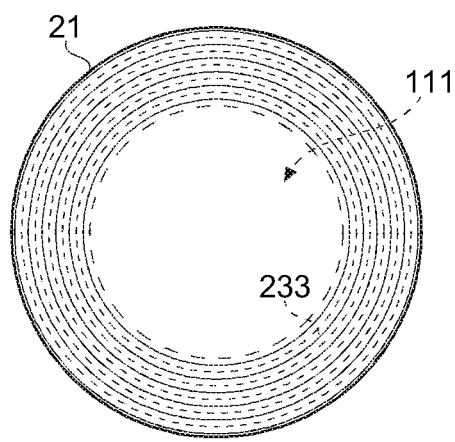
FIG. 16 shows a case where a window and a first member are in a line contact.

A case where the window 21 and the first member 110 are in line contact at multiple lines will now be described with reference to FIG. 16. As shown in FIG. 16, the window 21 and the first member 110 may form a line contact 233 at multiple lines that are concentric. In that case, multiple circular protrusions may be formed concentrically on a portion of a surface of at least one of the window 21 and the first member 110.

The protrusions may be formed symmetrically about the axis of the window 21 and/or the through-hole 111. Since the protrusions are formed symmetrically, the window 21 may be cooled uniformly from the periphery thereof. As a result, optical performance of the window 21 may be stabilized. Here, the window 21 may be positioned such that the beam axis of the pulse laser beam 31 passing through the window 21 substantially coincides with the axis of the window 21. Then, the window 21 may be cooled more uniformly, and optical performance thereof may further be stabilized.

8.4 Contact at Multiple Surfaces

Figure 17:
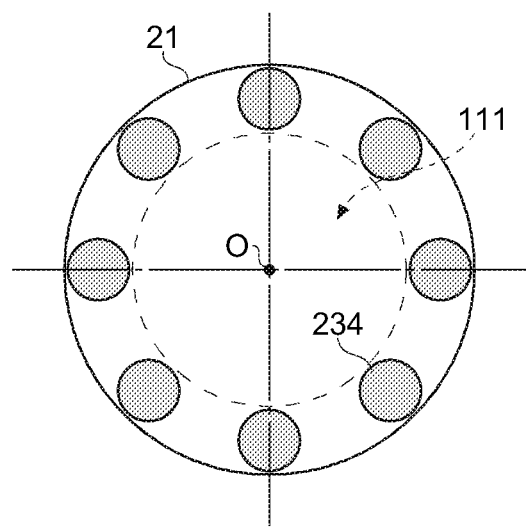
FIG. 17 shows a case where a window and a first member are in a surface contact at multiple surfaces.

A case where the window 21 and the first member 110 are in surface contact at multiple discontinuous surfaces will now be described with reference to FIG. 17. As shown in FIG. 17, the window 21 and the first member 110 may form a surface contact 234 at multiple discontinuous mating surfaces. In that case, island-like protrusions (surface contacts 234) may be formed in a portion of a surface of at least one of the window 21 and the first member 110.

The upper surface of each of the protrusions may have relatively high flatness. Further, the upper surfaces of the multiple protrusions may be flush with each other. The flatness of the upper surfaces may, for example, be enhanced by grinding. Further, a portion of the surface of one of the window 21 and the first member 100 where the protrusions are not formed may have relatively high flatness, and the flatness of this portion may, for example, be enhanced by grinding.

The island-like protrusions may be distributed symmetrically about the axis of the window 21 and/or the through-hole 111. Since the protrusions are distributed symmetrically, the window 21 may be cooled uniformly from the periphery thereof. As a result, optical performance of the window 21 may be stabilized. Here, the window 21 may be positioned such that the beam axis of the pulse laser beam 31 passing through the window 21 substantially coincides with the axis of the window 21. Then, the window 21 may be cooled more uniformly, and optical performance thereof may further be stabilized.

The above-described embodiments and the modifications thereof are merely examples for implementing this disclosure, and this disclosure is not limited thereto. Making various modifications according to the specifications or the like is within the scope of this disclosure, and other various embodiments are possible within the scope of this disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. A holder device for holding an optical element, comprising:
   a holder having first and second members to sandwich the optical element therebetween;
   a first sealing member for creating a seal between the second member and the optical element; and
   multiple protrusions formed on a portion of a surface of the first member, the protrusions being in direct contact with the optical element.

2. The holder device according to claim 1, wherein
   the holder has an opening to allow a laser beam to pass therethrough, and
   the protrusions are distributed symmetrically about an axis passing through the opening.

3. The holder device according to claim 2, wherein the protrusions are circular protrusions.

4. The holder device according to claim 2, wherein the protrusions are island-like protrusions.

5. The holder device according to claim 1, further comprising a second sealing member for creating a seal between the first member and the second member.

6. The holder device according to claim 1, further comprising a flow channel to allow a cooling medium to circulate in the vicinity of the first member.

7. The holder device according to claim 6, wherein
   the first and second members are positioned to sandwich a peripheral portion of the optical element, and
   the flow channel includes:
   a first flow channel running along the periphery of the optical element; and a second flow channel running from the first flow channel and having an opening in an outer surface of the holder.

8. The holder device according to claim 7, further comprising:
a pipe removably attached to the second flow channel; and
a cooling medium supply unit configured to supply a cooling medium into the pipe.

9. A chamber apparatus, comprising:
a chamber; and
a holder device for holding an optical element,
the holder comprising:
a holder having first and second members to sandwich the optical element therebetween;
a first sealing member for creating a seal between the second member and the optical element;
a second sealing member for sealing between the holder device and a wall of the chamber; and
multiple protrusions formed on a portion of a surface of the first member, the protrusions being in direct contact with the optical element.

10. The chamber apparatus according to claim 9, wherein the holder has an opening to allow a laser beam to pass therethrough, and
the protrusions are distributed symmetrically about an axis passing through the opening.

11. The holder device according to claim 10, wherein the protrusions are circular protrusions.

12. The holder device according to claim 10, wherein the protrusions are island-like protrusions.

13. The chamber apparatus according to claim 9, further comprising a third sealing member for creating a seal between the first member and the second member.

14. The chamber apparatus according to claim 9, further comprising a flow channel to allow a cooling medium to circulate in the vicinity of the first member.

15. The chamber apparatus according to claim 14, wherein the first and second members are positioned to sandwich a peripheral portion of the optical element, and
the flow channel includes:
a first flow channel running along the periphery of the optical element; and
a second flow channel running from the first flow channel and having an opening in an outer surface of the holder.

16. The holder device according to claim 15, further comprising:
a pipe removably attached to the second flow channel; and
a cooling medium supply unit configured for supplying a cooling medium into the pipe.

17. An extreme ultraviolet light generation system, comprising: a chamber apparatus comprising:
a chamber;
a holder device for holding an optical element, the holder comprising:
a holder having first and second members to sandwich the optical element therebetween;
a first sealing member for creating a seal between the second member and the optical element;
a second sealing member for sealing between the holder device and a wall of the chamber; and
multiple protrusions formed on a portion of a surface of the first member, the protrusions being in direct contact with the optical element;
a laser apparatus configured to output a laser beam;
a target supply unit configured to supply a target material into the chamber; and
an optical system configured to focus the laser beam inside the chamber through the optical element.

18. The chamber apparatus according to claim 17, wherein the holder has an opening to allow a laser beam to pass therethrough, and
the protrusions are distributed symmetrically axis passing through the opening.

19. The holder device according to claim 18, wherein the protrusions are circular protrusions.

20. The holder device according to claim 18, wherein the protrusions are island-like protrusions.

21. The chamber apparatus according to claim 17, further comprising a third sealing member for creating a seal between the first member and the second member.

22. The chamber apparatus according to claim 17, further comprising a flow channel to allow a cooling medium to circulate in the vicinity of the first member.

23. The chamber apparatus according to claim 22, wherein the first and second members are positioned to sandwich a peripheral portion of the optical element, and the flow channel includes: a first flow channel running along the periphery of the optical element; and a second flow channel running from the first flow channel and having an opening in an outer surface of the holder.

24. The holder device according to claim 23, further comprising:
a pipe removably attached to the second flow channel; and
a cooling medium supply unit configured for supplying a cooling medium into the pipe.

* * * * *